United States Patent [19]

Kroupa et al.

[11] Patent Number: 4,988,189

[45] Date of Patent: Jan. 29, 1991

[54] PASSIVE RANGING SYSTEM ESPECIALLY FOR USE WITH AN ELECTRO-OPTICAL IMAGING SYSTEM

[75] Inventors: Richard F. Kroupa, Lansdowne; Thomas J. Willett, Baltimore; Glenn E. Tisdale, Severna Park, all of Md.

[73] Assignee: Westinghouse Electric Corp., Pittsburgh, Pa.

[21] Appl. No.: 309,864

[22] Filed: Oct. 8, 1981

[51] Int. Cl.[5] .............................................. G01C 3/08
[52] U.S. Cl. .......................................... 356/4; 356/1; 358/107; 364/456; 364/458; 382/44; 382/45; 382/46; 382/47
[58] Field of Search ................... 343/112 D; 356/1, 4; 358/107; 364/456, 458, 561, 565; 382/42, 44, 45, 46, 47

[56] References Cited

U.S. PATENT DOCUMENTS

| | | | |
|---|---|---|---|
| 3,453,047 | 7/1969 | Olson et al. | 356/4 |
| 3,495,906 | 2/1970 | Firmin | 356/4 |
| 3,636,513 | 1/1972 | Tisdale | 343/112 C |
| 3,653,769 | 4/1972 | Albright | 364/456 |
| 3,748,644 | 7/1973 | Tisdale | 343/5 MM |
| 3,947,833 | 3/1976 | Eckstein, Jr. | 358/107 |
| 3,976,982 | 8/1976 | Eiselen | 382/46 |
| 3,982,246 | 9/1976 | Lubar | 343/112 C |
| 4,168,488 | 9/1979 | Evans | 382/46 |

Primary Examiner—Stephen C. Buczinski
Attorney, Agent, or Firm—W. G. Sutcliff

[57] ABSTRACT

A passive ranging system functions in conjunction with an electro-optical imaging system to compute a range measurement based on determined changes of the image of a designated object or objects or image features representative thereof in the scene of an image sensor which is transported from one position to another with respect to the designated objects. In the present embodiment, the image sensor generates frames of image information corresponding to the one and another positions thereof while maintaining substantially a common image scene in its field of view. Image features representative of the designated image objects are extracted from at least a selected portion of the two frames for registration in accordance with a predetermined matching criteria. The variations in the geometric relationship of common image features of the registered selected portions of the two frames caused by the image sensor positioning are determined and used together with the one and another image sensor positions, measured with respect to the designated objects, for computing the range measurement in question.

8 Claims, 3 Drawing Sheets

PASSIVE RANGING SYSTEM ESPECIALLY FOR USE WITH AN ELECTRO-OPTICAL IMAGING SYSTEM

BACKGROUND OF THE INVENTION

The present invention relates to electro-optical target recognition systems, in general, and more particularly, to a passive ranging system adapted for use in conjunction therewith to improve the performance thereof.

Electro-optical (E-O) automatic target recognition systems generally include the preprocessing, registration, and classification of E-O sensor image information of a plurality of frames common to the same field of view (FOV) or scene. In most E-O systems, the image sensor may be either a conventional television camera (TV) or a forward-looking infrared camera (FLIR). Some E-O target recognition systems may be adapted for use on board an aircraft or the like in connection with reconnaissance and/or weapon delivery tasks. In these systems, certain image features of one or more objects, preferably targets, may be extracted from the image scene of one frame for registration with extracted features of common objects of another frame viewing the same image scene. Once the common extracted object image features of one frame are registered with respect to another frame in accordance with some best-fit criteria, for example, a classification of the object in question may be performed utilizing a set of predetermined reference target image features.

However, without range information to an object as observed by an E-O imaging system, classification of the object as a target may become an onerous or somewhat confusing task especially for an automatic recognition system. For example, when an E-O sensor on board an aircraft is pointed towards the horizon, an entire clearing in the field of view thereof may appear blob-like in the sensor frame image and may possibly be characterized as a tactical target if the range to the clearing is unknown. With range information available however, such potential false alarms may be avoided merely on the basis of size of the object or area in question. In fact, target recognition tests with an E-O system have demonstrated improved performance, particularly in the rejection of false alarms, if accurate range information of the object or target in question is available.

Active ranging processors have been proposed to provide the needed range information for some airborne automatic target recognition systems. However, since these processors rely on the emissions of radiation in the form of microwave or laser energy, for example, in a hostile environment, the emitted radiation has the undesirable effect of providing an opportunity of detection and possible counterattack by an enemy. For this reason, passive ranging systems are felt safer, especially in these hostile environments, in that there is no reliance on energy radiation for range computations, and thus no transmission signal for an adversary to detect and track.

Some airborne E-O target recognition systems derive a crude estimate of range passively by combining the aircraft altitude measurements with the E-O sensor depression angle. Needless to say, the accuracy of this computation depends strongly on the assumption that the elevation of the object in question is the same as the ground reference used for the aircraft altitude measurement (i.e., flat earth concept). For all practical purposes, this approach suffers from its insensitivity to the actual terrain configurations and from its over sensitivity to errors especially at low grazing angles where the range to the target also depends heavily on the location of the target in the field of view. In some cases, at low altitudes, errors in the range measurement caused by the failure of the aforementioned assumption (flat earth) appear to mount rapidly to intolerable levels.

Apparently, a passive ranging system which can avoid the aforementioned difficulties in measuring range and provide an accurate range measurement to the object in question or to a point or area in the vicinity thereof could compliment and improve the performance of an E-O target recognition system in the automatic identification and classification of various objects in its field of view.

SUMMARY OF THE INVENTION

In accordance with the present invention, a passive ranging system is adapted for use in conjunction with an electro-optical imaging system to improve the performance thereof. An image sensor of the imaging system is transportable from one position to another while maintaining substantially a common image scene in the field of view thereof. The sensor is additionally adapted to generate one and another frames of image information of said common scene corresponding to the one and another positions, respectively. An image preprocessing means of the imaging system includes means for extracting from the one and another frames image features representative of various objects in the common scene and for determining a geometric relationship of the extracted image features within each frame; means for selecting at least a portion of each image frame to include the image features belonging to at least one object image; and means for registering the extracted image features in the selected portions of the one and another frames in accordance with a predetermined matching criteria. The passive ranging system includes means for determining variations in the geometric relationship of common image features of the registered selected portions of the one and another image frames; and means for computing a range measurement from the image sensor to a vicinity of the object, having image features in the selected image portions of the one and another frames, as a function of the determined variations in geometric relationship of the common image features thereof and the one and another image sensor positions with respect to said vicinity.

In accordance with another aspect of the invention, the image preprocessing means includes means for determining the geometrical relationship of the extracted image features of a frame with respect to a reference position corresponding to the frame. Moreover, the selecting means selects the image portion of each frame to additionally include the corresponding reference position. The passive ranging system further includes a means for compensating the determined geometrical variations of the common image features in accordance with a geometrical variation of the frame reference position between the registered selected portions of the one and another frames. Preferably, the image preprocessing means determines the positions of the extracted image features of a frame with respect to a frame reference position corresponding to the frame. In this case, the passive ranging system determines a change in the positions of common image features of the registered selected portions of the one and another frames and computes the range measurement as a function of the determined positional changes thereof and the one and another image sensor positions.

The range measurement computation may, in one embodiment, be based on a function which may be mathematically expressed as:

$$R = \Delta R(\theta/\Delta\theta),$$

where R is representative of the range measurement from the another position of the E-O image sensor to the vicinity of the object of the selected portion; ΔR is representative of the difference in the one and other positions of the E-O sensor from the vicinity; θ is representative of a positional relationship of the image features of the selected image portion of the another frame with respect to the reference position thereof; and Δθ is representative of the changes in positions of the image features of the selected portion between the one and another frames.

In accordance with another aspect of the present invention, the passive ranging system includes means for expanding the determined positional change of an image feature into radial and tangential components constituting translational and rotational variations, with respect to the frame reference position; and means for computing the range measurement using only the radial components of the positional change of the common image features.

DESCRIPTION OF THE PREFERRED EMBODIMENT

Figure 1:
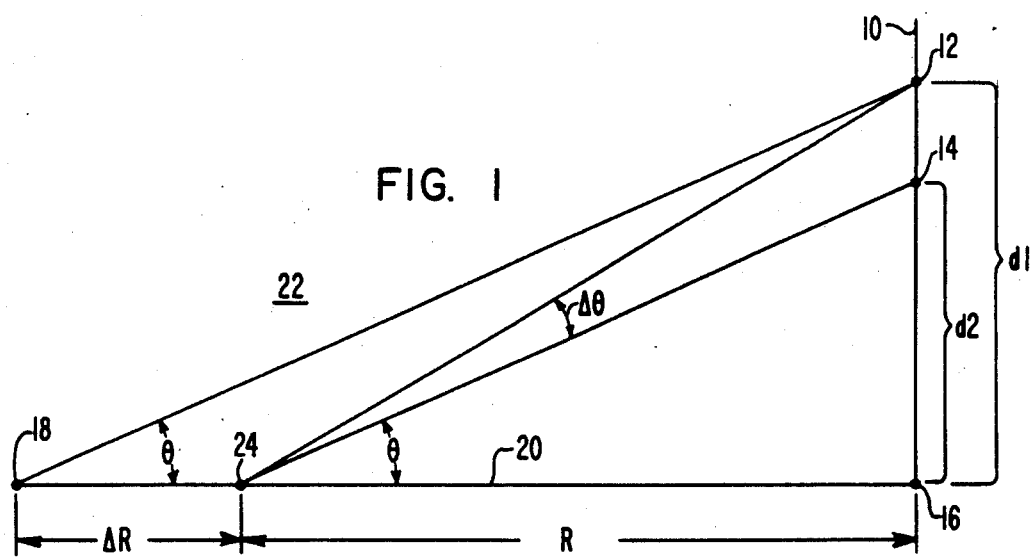
FIG. 1 is a simple diagram sketch for use in explaining the broad concepts of the present invention.

A passive ranging system functions in conjunction with an electro-optical imaging system to compute a range measurement from the image sensor of the imaging system to a vicinity of a designated object or objects in the field of view of the image sensor. The passive range computation is based on determined change of the image of the designated object or objects or image features representative thereof as the image sensor is transported from one position to another with respect to the designated objects. In the present embodiment, the image sensor generates frames of image information corresponding to the one and another positions thereof while maintaining substantially a common image seen in the field of view thereof. Image features representative of the designated image objects are extracted for at least a selected portion of the two frames. Thereafter, the extracted image features of the selected portions of the two frames are registered in accordance with a predetermined matching criteria. The variations in the geometric relationship of common image features of the registered select portions of the two frames are determined and used together with the one and another image sensor positions measured with respect to the designated objects for computing the range measurement in question.

The preferred embodiment of the proposed passive ranging system will be described herebelow in connection with an electro-optical imaging system including an image sensor which is transportable from one position to another position while maintaining substantially a common image scene in the field of view thereof. The image sensor may be adapted to generate one and another frames of image information of the common scene corresponding to the one and another positions, respectively. For the present embodiment, the electro-optical system may be an automatic target recognition system operating onboard an aircraft, which may be a fixed wing airplane, a helicopter, or the like, and the passive range measurement is estimated by performing a sequential comparison of the two frames of image information or portions thereof taken at the one and another positions of the sensing aircraft In a fixed wing airplane, the motion of the image sensor may be substantially in the general direction to or from a target area. In contrast, the helicopter's motion may be predominantly lateral to the target vector, either horizontal or vertical, for example. In some cases, a combination of the motions may be involved.

For the purposes of describing the preferred embodiment, it was not felt necessary to include the details of the structural arrangement of the assembly of the automatic target recognition system on-board an aircraft. Accordingly, it will be assumed that image sensor is mounted on a stable platform of the aircraft for the present embodiment as is conventionally the case.

In principle, the proposed passive ranging scheme measures the image variation geometrically between predetermined image features characterizing a common candidate target or object in the image information of the one and another looks. When these geometric image variations are combined functionally with the measured distance moved by the aircraft during the time interval between the generation of the two looks, a range measurement estimate to the target or object in question may be obtained.

For a simple explanation of the aforementioned concept, an image sensor may be considered moving directly toward the center of an array of dots marked on a wall. Referring to the simple diagram sketch of FIG. 1, the solid line 10 depicts the side view of a wall with an array of dots 12, 14 and 16 imposed thereon. An image sensor (not shown) is assumed to start at position 18 and move toward the wall 10 along the straight line 20 in the same plane 22. At the position 18, the image sensor may sense the distance d1 between the dots 12 and 16 with a viewing angle θ. As the image sensor moves closer in range to the wall, say to position 24 for example the array of dots appear to expand Δθ for the fixed sensor field of view θ. With the value of image expansion Δθ, coupled with the value of motion toward the wall ΔR, between points 18 and 24, a computation of the range R from the wall 10 at position 24 is possible. More specifically, for motion ΔR from point 18 to point 24, with the image sensor boresighted on point 16 the angular distance between points 16 and 12 grows from $\theta$ to $\theta + \Delta\theta$. Therefore, since the actual distance between the points 16 and 12 remains constant, it follows that:

$$R \tan(\theta + \Delta\theta) = (R + \Delta R)\tan \theta. \qquad (1)$$

For small angular fields of view $\theta$, the tangent of an angle may be closely approximated by its argument angle, so equation (1) may be rewritten as:

$$R(\theta + \Delta\theta) = (R + \Delta R)\theta, \qquad (2)$$

and thereafter rearranged as follows:

$$R = \Delta R \cdot (\theta/\Delta\theta) \qquad (3)$$

The range to the wall 10 from point 24 therefore is a function of the image expansion from 14 to 12. That is, the ratio of the original viewing angle $\theta$ to the change in viewing angle $\Delta\theta$ with respect to the same image as the wall is approached. Moreover, for a different dot location, this aforementioned ratio will remain unchanged, since, referring to the sketch of FIG. 1:

$$\tan \theta = d1/(R + \Delta R) = \Delta R/R, \text{ and} \qquad (4)$$

$$d1/d2 = (R + \Delta R)/R, \text{ or} \qquad (5)$$

$$(d1 - d2)/d2 = \Delta R/R. \qquad (6)$$

For the more general situations in which an aircraft moves in three dimensions and looks at a terrain surface which is not a plane normal to the line-of-sight of the image sensor (non-planar motion), the mathematics for computing the range measurement may be a little different from that expressed in equation (3) above. To facilitate range computations for this general motion case, one assumption that can be made reasonably is that the image sensor is stabilized in position onboard the aircraft between the sequential looks. Under this assumption, the motion of the aircraft may be derived for two planes, one being motion in the $\Delta R$ and $\Delta X$ directions, and the other being motion in the $\Delta R$ and $\Delta Y$ directions. In addition, because of the aircraft motion between the one and another positions is outside of a planar motion, it may be assumed that the computations for range R may include a differential in range dr which is representative of the depth of a cited object within the image of the two positions. Taking these assumptions into account, a new range computation may be mathematically expressed by the following equation:

$$R + dr = [\sqrt{(\Delta X)^2 + (\Delta Y)^2} \ (1 + \Delta R + dr/R) + \Delta R]/\Delta\theta/\theta. \qquad (7)$$

With respect to equation (7), under ordinary conditions, the range R to be measured is generally much larger in value than the depth dr of the designated image portion of the same (i.e. $R >> dr$). Therefore, the terms dr/R and R+dr of equation (7) may be approximated by the terms O and R, respectively, thereby reducing equation (7) to:

$$R \approx [\sqrt{(\Delta X)^2 + (\Delta Y)^2} \ (1 + \Delta R) + \Delta R]/\Delta\theta/\theta. \qquad (7A)$$

The terms $\Delta X$, $\Delta Y$ and $\Delta R$ of equation (7A) are all considered measurable with respect to the designated object or objects in the image scene. In an analysis of equation (7A), the range measurement R may be expanded into its contributing terms as shown below:

$$R \approx [\sqrt{(\Delta X)^2 + (\Delta Y)^2} \ (1 + \Delta R)] \cdot (\theta/\Delta\theta) + \Delta R \cdot (\theta/\Delta\theta). \qquad (7B)$$

The first term of equation (7B) reflects the contribution of the non-planar motions of the sensor with respect to the designated objects or object and the second term is identical to equation (3) supra which is a measure of range for planar motion of the image sensor.

Therefore, from the above analysis of equation (7B), it appears theoretically possible, by observing one or more objects in the field of view of an image sensor with respect to a boresighted point, to determine an estimated range in the vicinity thereof. Accordingly, this may be achieved with planar or non-planar motion of an aircraft containing the image sensor or a combination of motions thereof (see equation 7B).

Typical electro-optical automatic target recognition systems similar to the embodiment shown by FIG. 2 have been disclosed in the following two issued U.S. Pat. Nos.

3,636,513 issued to Glenn E. Tisdale on Jan. 18, 1972 and entitled "Preprocessing Method and Apparatus for Pattern Recognition"; and 3,748,644 issued to Glenn E. Tisdale on July 24, 1973 and entitled "Automatic Registration of Points in Two Separate Images", both being assigned to the same assignee as that of the instant application. Accordingly aforementioned referenced U.S. Pat. Nos. 3,636,513 and 3,748,644 are hereby incorporated by reference herein for the purposes of providing an exemplary description of the image feature extraction and registration between frames of image information or portions thereof with respect to the embodiment of FIG. 2. Moreover, in connection with the description of the embodiment depicted in FIG. 2, FIGS. 3A, 3B, 3C, 3D, 4 and 5 are provided as image illustrations of the various image feature processing carried out by the system elements of the preferred embodiment.

Figure 2:
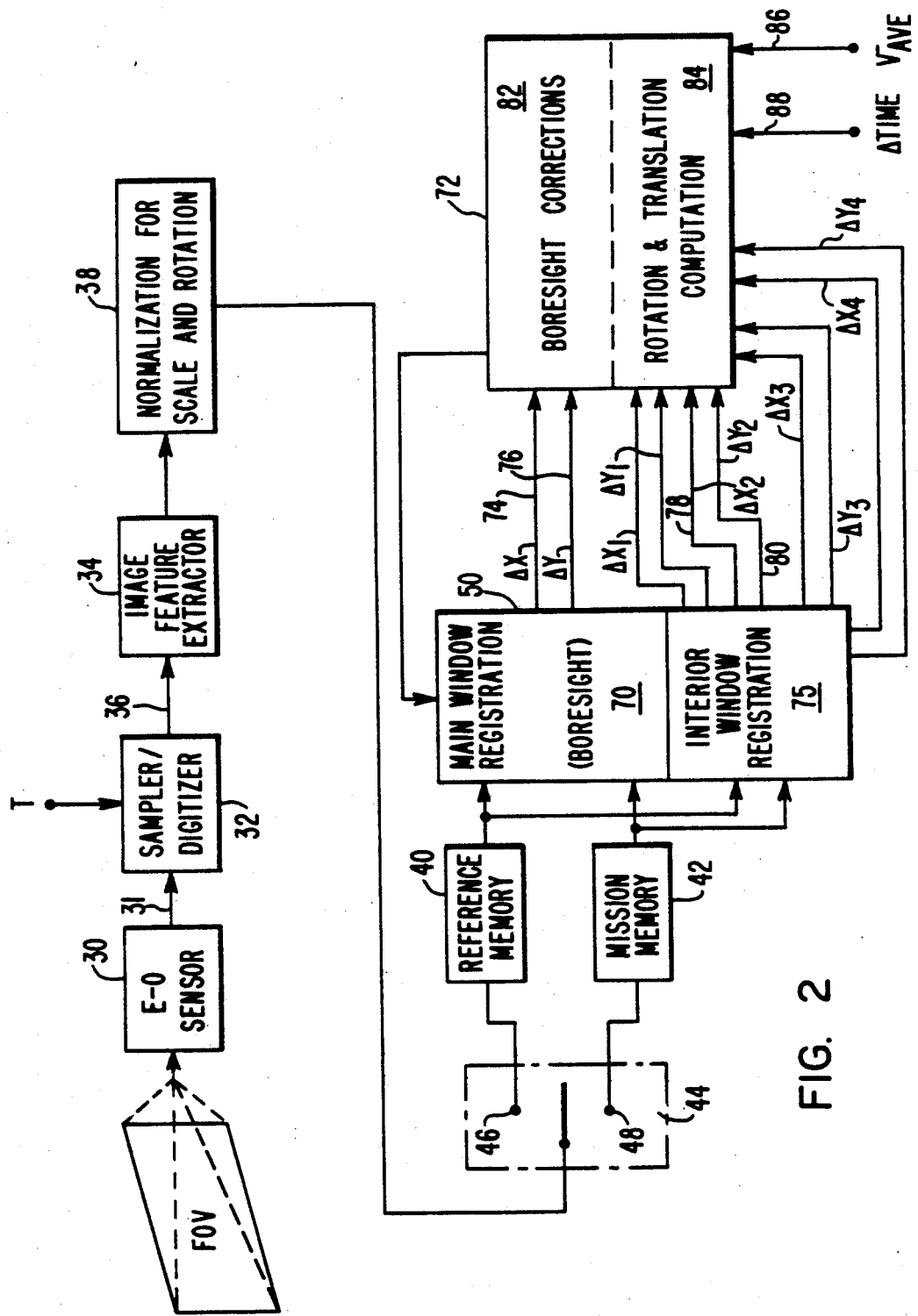
FIG. 2 is a block diagram schematic of an electro-optical imaging system suitable for embodying the principles of the present invention.

Because the description of the image feature extraction and registration between frames is provided in the aforementioned references, only a brief description of the preprocessing elements of the embodiment shown in FIG. 2 is provided for this purpose. For example, an E-O sensor 30, which may be a TV or FLIR, views a field of view (FOV) or scene and converts the image thereof into electrical signals generally in the form of a conventional raster scan frame which may be passed along over signal line 31 to a sampler/digitizer functional block 32. In the present embodiment, the digitizer 32 may be commanded by a time signal T, for example, to sample a frame of image information at each of the two designated positions of the image sensor. Accordingly, each frame of image information is divided into a predetermined array of picture elements (pixels) by the digitizer 32. Associated with each pixel is a digital value corresponding to the intensity level thereof within the designated frame of image information. The indexed pixels and associated intensity values are provided to an image feature extractor 34 via signal lines 36. The image feature extractor 34 may be typical of the type described by the hereabove-referenced U.S. Pat. No. 3,636,513.

In some cases, the image features of a scene may be extracted from a frame of image information based on the principle of intensity contrast gradients, more commonly referred to as line segments. More particularly, each line segment may be characterized by the position of its end points with respect to a reference point of each image frame, which for the present embodiment may be considered the boresight of the aircraft. In this case, it is the positions of the end points of the line segments which may be used to determine the geometric relationships of common image feature sets between the one and another frames. The extractor 34 may operate on all or limit its preprocessing to only a selected portion of the image scene. The selected portion is generally in the vicinity of a designated object or target or groups thereof.

After the extraction process of block 34 is complete for an image frame, the extracted image feature data may be supplied to another block 38 in which the image feature set associated with various designated objects are normalized for scale and rotation. Reference is again made to the U.S. Pat. No. 3,636,513 for a description of such operations in greater detail. The processed image data exiting the block 38 may be stored in either a reference memory 40 or mission memory 42 depending upon the frame in the sequence from which it was extracted. For example, a switch 44 may be governed to position 46 at times when the processed image feature data results from the first frame corresponding to the first position of the sequence to permit storage thereof in the reference memory 40. Conversely then, the switch 44 may be governed to position 48 to permit the processed image feature information from the second frame corresponding to the second position to enter the mission memory 42. After the image feature data extracted from the two frames is stored in the memories 40 and 42, it is next passed along selectively to the functional block 50 wherein an automatic registration of the image features of the two image frames or portions thereof is performed. The registration operations performed by the block 50 may be similar to the registration method described in the aforementioned referenced U.S. Pat. No. 3,748,644. A simple example of this registration process will be described herebelow in connection with FIGS. 3A through 3D.

Figure 3A:
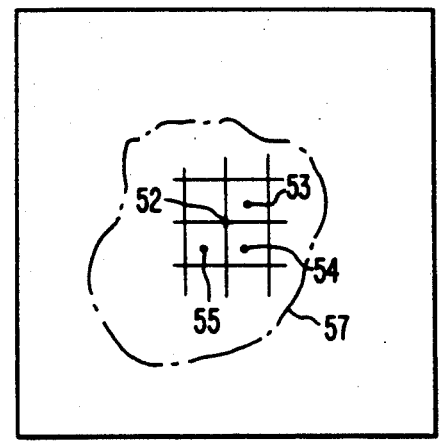
FIGS. 3A–3D are simple scene image illustrations suitable for use in explaining the preprocessing operations carried out by the embodiment of FIG. 2.

The illustrative sketch of FIG. 3A is representative of a two-dimensional image reference frame viewed at the first position of the aircraft by the image sensor thereof. A boresight represented by the cross hairs 52 is established in the vicinity of an object image or group of object images for which a range measurement is desired. The boresight 52 may be initially positioned preferably in the middle of the first frame or reference frame as the case may be. The three dots 53, 54 and 55 surrounding the boresight 52 in the reference frame of FIG. 3A are representative of image feature points from three objects. The dot-dashed line 57 reflects the portion of the reference frame designated for image preprocessing as described hereabove.

Figure 3B:
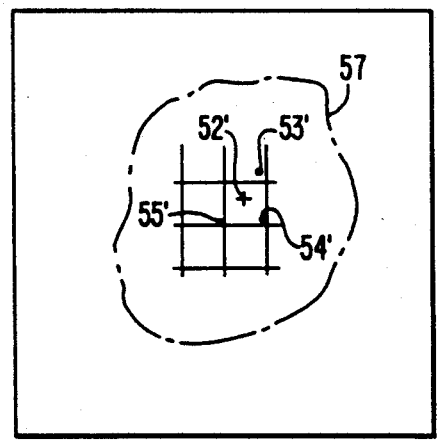
Figure 3C:
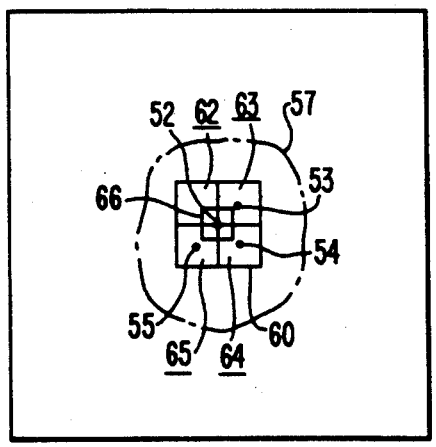

In the present embodiment as shown by FIG. 3C, an overall window, which may be on the order of 100×100 pixels in area, is adjusted within the image portion 57 to include the image feature points 53, 54 and 55 and for convenience, having the boresight 52 at its center. The window 60 may be further broken down into five interior windows labeled 62 through 66 as shown in the image frame of FIG. 3C. The windows 62 through 65 may constitute the four quadrants of the overall reference window 60. The fifth or center window 66 may be centered about the boresight 52 in the middle of the reference window 60. As a further matter of convenience for the range computations in connection with the example of FIGS. 3A–3D, the feature points 53, 54 and 55 are positioned at the center of the interior windows 63, 64 and 65, respectively. In the present example, no image points are shown for the interior window 62 and it may be assumed that the image feature information extracted for that portion of the reference window may have been insufficient or avoided. Needless to say, while only three image feature points are shown in the FIGS. 3A and 3C for this example, for a typical case, it is expected that as many as 200 or more image feature points may be found in each of the interior windows 62 through 65 as well as the center interior window 66.

Figure 3D:
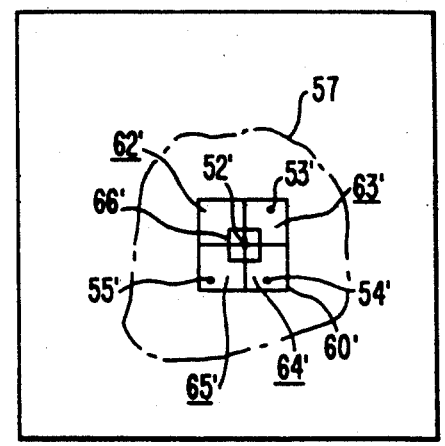

The additional illustrative sketches of FIGS. 3B and 3D are provided to illustrate the geometric variation of the image feature points within the designated portion 57 of the image frame associated with the second position. The change in the positions of the image feature points denoted as 53', 54' and 55' are observable with respect to the reticle markings in comparing the illustrations of FIGS. 3A and 3B. It is also noted that the new position of the cross hairs or boresight 52' has deviated from its initial position 52 between frames. As shown by the sketch of FIG. 3D, a new reference window 60' and interior windows 62' through 66' again are provided to define a portion of the image surrounding the new positions of the image feature points 53', 54' and 55' as well as the new position of the cross hairs 52'.

Figure 4:
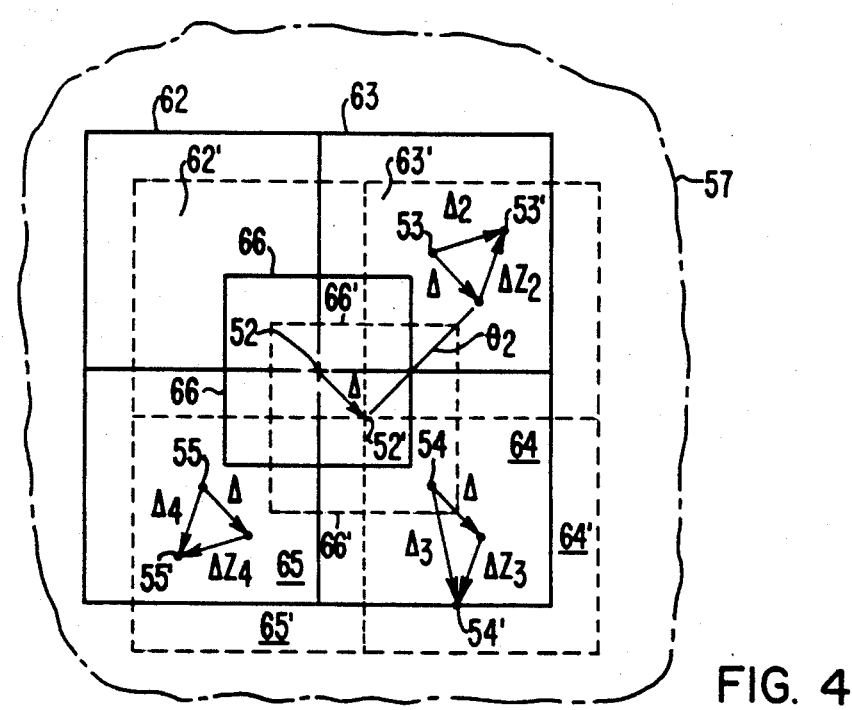
FIG. 4 is a simple sketch illustrating the registration process of a selected portion of image information from two frames, the process being exemplary of that which may be carried out in the registration block of the embodiment depicted in FIG. 2.

The registration process carried out by functional block 50 is briefly described herebelow in connection with the sketch of FIG. 4. Referring to FIG. 4 the solid line blocks 62–66 surround the original or reference positions of image feature points 53, 54 and 55 as well as the boresight 52, which has already been described in connection with FIG. 3C hereabove. The dashed line blocks 62'–66' surround the new positions 53', 54' and 55' of the image feature points as well as the new position of the boresight 52'. The change in geometrical relationship $\Delta_i$ between the reference and new image feature points are appropriately indexed (i.e., the variation in position between 52 and 52' of the boresight is designated by the vector $\Delta$; similarly, the positional variation between 53 and 53' is designated by $\Delta_2$, and so on).

More specifically, one portion 70 of the registration block 50 (see FIG. 2) may be operative to perform a registration on the image feature information of the center interior windows 66 and 66'. This initial registration may be conducted to eliminate such effects on the image sensor as sensor platform instability, image sensor rotation, aircraft movement such as spin and so on, and even the inability of the image sensor to track a designated target or image if this becomes a problem.

Once the image feature sets of the center interior window 66 and 66' are registered (overlayed) in accordance with some predetermined matching or best-fit criteria, for example, the only appreciable difference expected between the line segments or contrast edges may be the local distortions caused by a change of perspective of the image sensor position. Consequently, the geometric variation of the registered boresight positions 52 and 52' may be measured in terms of cartesian coordinates and denoted as $\Delta X$ and $\Delta Y$ (see FIG. 4) provided to a passive range computer 72 as shown in FIG. 2 over the signal lines 74 and 76, respectively. The passive range computer 72 may store the boresight positional variation for correction of the geometric variations of the image points 53, 54 and 55 which may be derived in accordance with the registration processing occurring in another portion 75 of the registration block 50.

In the registration processing portion 75, each of the interior windows 62 through 65 may be registered with their respectively corresponding interior windows 62' through 65' using a similar best-fit criteria of the image features associated therewith. In each case, the variation in position of the image feature points may be determined after the registration process is accomplished. Each of the positional variations of the image feature points may be measured again in terms of their cartesian coordinate components and supplied to the passive range computer 72. For example, for the positional change $\Delta_2$, the cartesian coordinates $\Delta X_2$ and $\Delta Y_2$ are provided to the computer 72 over signal lines 78 and 80, respectively. In this same manner, the remainder of the positional variations $\Delta_3$ and $\Delta_4$ are similarly provided to the computer 72 from the interior window registration processing unit 75.

A portion 82 of the passive range computer 72 may be utilized to perform the boresight corrections of the positional variations $\Delta_2$, $\Delta_3$ and $\Delta_4$ associated with the various image feature points 53, 54 and 55. As shown by the illustration of FIG. 4, the positional variations corresponding to the image feature points 53 and 53' between the successive image frames may comprise the vector components $\Delta$ and $\Delta Z_2$. Likewise, the other two positional variations $\Delta_3$ and $\Delta_4$ also comprise a similar combination of vectors $\Delta$ and $\Delta Z_3$ and $\Delta$ and $\Delta Z_4$, respectively. Note that in each case the boresight positional variation vector $\Delta$ is included in the vector combination of the positional variations of the image feature points. Therefore, in the preferred embodiment, the boresight positional change $\Delta$ may be subtracted vectorially from the positional variations of all of the image feature points taken into consideration. The resulting vector measurements $\Delta Z_2$, $\Delta Z_3$ and $\Delta Z_4$ corresponding to the image feature points 53, 54 and 55 thus represent the positional variation thereof from the first frame to the second frame. In other words, the vector measurements $\Delta Z_2$, $\Delta Z_3$ and $\Delta Z_4$ relate to a geometrical change from where the image should be in the second frame with no movement of the aircraft (image sensor) to where the image actually is because of movement of the aircraft.

Figure 5:
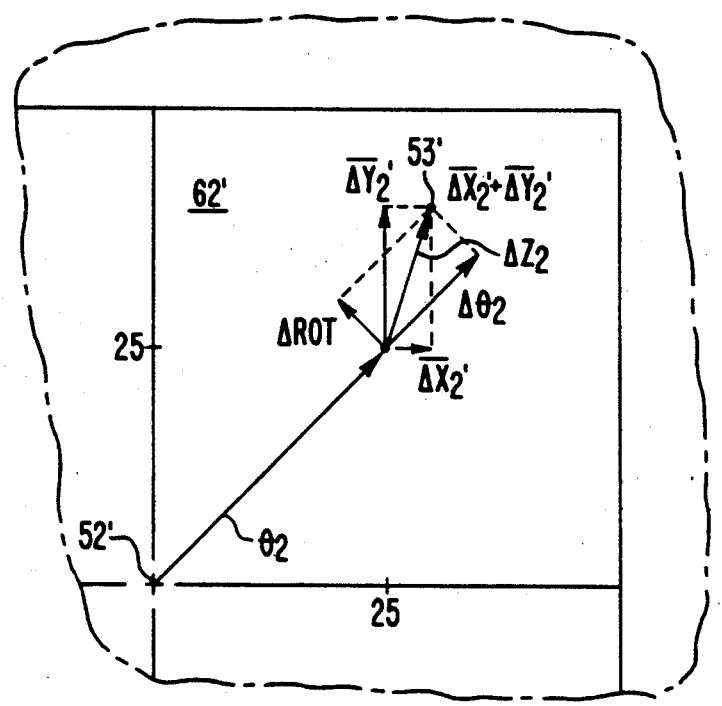
FIG. 5 depicts illustratively the expansion of a positional change vector of an image feature into its rotational and translational components with respect to a frame reference point which exemplifies a process which may be carried out in the passive range computer of the embodiment depicted in FIG. 2.

In the sketch of FIG. 5 is shown an expanded view of one of the interior windows 62' in relation to the new position of the boresight 52' corresponding to the second image frame. Comparing the sketches of FIGS. 4 and 5, it is observed that the position of the image feature point 53 with no range change $\Delta R$ of the image sensor between the two frames may be designated by the vector $\theta_2$ with respect to the boresight reference point 52'. However, because of a range change occurring between the two designated image frames, the image feature point 53 is caused to have a compensated positional variation $\Delta Z_2$ which has the compensated cartesian coordinate values $\Delta X_2'$ and $\Delta Y_2'$ associated therewith.

Another portion of the range computer 72, denoted as portion 84 in FIG. 2, may be utilized to expand the image feature point positional change $\Delta Z_i$ into rotational and translation components. It is understood that the rotational component, designated as $\Delta ROT$, is not a measure of the image change as a result of a positional variation of the image sensor or aircraft However the colinear (radial) component $\Delta \theta_2$ with respect to the cross-hairs 52' does represent a change in position of the image feature point 53 (expansion) as a result of a change in range of the image sensor between the designated image frames and it is this vector component $\theta_2$ that is used for measuring the variation in the image pattern between looks. Accordingly, for each feature image point in the interior windows 63, 64 and 65 a similar derivation may be performed by the range computer 72 to extract only the radial vector component $\Delta \theta_i$ representing the positional change of the image feature point as a result of the change in range of the image sensor.

Now, in order to compute the range change of the image sensor between the two designated frames (i.e., between position 1 and position 2), the range computer 72 may use a signal representative of the average velocity of the aircraft supplied thereto over signal line 86 and a signal representative of the increment of time between the two designated frames supplied thereto over a signal line 88. Accordingly, the change in range $\Delta R$ between positions 1 and 2 for planar or non-planar motions may be computed by multiplying vectorially the average velocity with the time increment obtained from the signal lines 86 and 88, respectively. For the case of planar motion, the $\theta$, $\Delta \theta$ and $\Delta R$ information derived for the two designated frames in connection with the object image or images of interest may be utilized by the range computer 72 to compute an estimate of the range R to the object images in question as a function similar to that described in connection with equation (3) hereabove. As a result, this additional parameter of range may be included in the classification process of the electro-optical system as a measure of the size of the object or objects in question.

As an example of an operational scenario for the present passive ranging embodiment, assume there exists an image scene containing one or more objects of interest for classification purposes, and that an aircraft is flying at an average speed of 300 feet/second and includes an image sensor 30 onboard which views the scene with two frames of data taken on the order of 2.5 seconds apart. Also assume that the image or scene contains three mobile vehicles, like trucks or tanks, for example, and that the image feature points 53, 54 and 55 of the image scene illustrations FIGS. 3A through 3D represent image feature points respectively corresponding to the three mobile vehicles. Both frames of information or portions thereof may be registered for boresight shift as described in connection with the diagram of FIG. 4. One result of this operational example is that the second look or frame is identified by the registration block 50 as being shifted with respect to the first look 0.22 pixels to the right ($\Delta X$) and 1.16 pixels up ($\Delta Y$). This information may be provided to the passive ranging computer 72 for boresight corrections in the computational portion 82 thereof.

After the boresight shift calculations the four interior windows, which may be sized 50×50 pixels each may next be extracted from the memories 40 and 42 and registered in the portion 75 of the registration block 50. For the ease in computation for the present example, it was assumed that each of the image feature points 53, 54 and 55 were initially positioned at the center of the interior windows 63, 64 and 65, respectively. Thus, the positional radial vector $\theta$ for each of the image feature points has a value of $25\sqrt{2}$ pixels from the boresight location 52'. Each of the interior windows 63, 64 and 65 may be registered in the registration block 50 as described above with their respective counterparts 63', 64' and 65'. The positional variations of the image feature point $\Delta_2$, $\Delta_3$ and $\Delta_4$ respectively resulting from the registration processes may be compensated for the boresight movement 0.22, 1.16) in the portion 82 of the range computer 72 rendering respective $\Delta X$ and $\Delta Y$ cartesian coordinate change vectors. Thereafter, the rotational and radial (translational) components ($\Delta ROT$ and $\Delta \theta$) of the positional variations of the image feature points may be derived in the portion 84 of the computer 72. The following table exemplifies the values resulting from the aforementioned deviations:

| Interior Window | $\Delta X$ | $\Delta Y$ | $\Delta ROT$ | $\Delta \theta$ |
|---|---|---|---|---|
| 63 | 0.48 | −3.82 | −3.04 | 2.36 |
| 64 | −1.29 | −7.25 | 6.04 | 4.21 |
| 65 | −5.83 | −1.41 | −5.12 | 3.13 |

(all values given above are in terms of pixels)

If it is assumed that the earth is basically flat in that portion of the field of view centered about the reference boresight including the three designated objects, it is acceptable to compute an average image feature change as follows:

$$\Delta\theta = (2.36 + 4.21 + 3.13)/3 = 3.23 \, pixels \quad (8)$$

Accordingly, since $$\Delta R = 2.5 sec \cdot 300 ft/sec = 750 ft. \quad (9)$$

and, $\overline{\theta} = 25\sqrt{2}$ pixels, then by substituting these values into the range equation (3) derived above, the range may be estimated by the range computer 72 as:

$$R = 750 \, ft. \cdot 25\sqrt{2}/3.23 = 8,209 \, ft. \quad (10)$$

With the assumption of a relatively flat earth in close proximity about the reference boresight, the above equation (10) is acceptable to provide a typical E-O target recognition system with an estimate of range R to the object or objects in question in accordance with the embodiment described in connection with FIG. 2. From the example given above, it appears that only one value of $\Delta \theta$ and $\theta$ taken from any one of the interior windows 63, 64 or 65 would be sufficient to perform a range calculation. Technically, this is indeed the case, however, the accuracy of the range estimate is improved with more and more values used.

Moreover, it is safe to say that the more abundant the detail of the scene as viewed by the image sensor, the more valid the registration process will be. In other words, without rich scene detail the estimate of range calculation becomes very vulnerable to the presence of noise. To ameliorate this problem, a passive ranging system like the one described in connection with FIG. 2, may measure the correlation peaks of the various designated image feature points during the registration process as performed in block 50 so as to identify when a computational result of image positional change is suspect of being in error. For example, if a max. peak point derived during correlation is determined to be too small (i.e., lower than some predetermined threshold level), it may be thrown out or disqualified. In addition, if during the correlation process it is determined that an image feature point has secondary max. peak points with approximately the same magnitude as a primary peak point, for example, a non-unique situation becomes evident and the positional variation for the image feature point may also be disqualified. This being the case in the present embodiment, the registration results for interior window 62, for example, may have been suspect of being in error as a result of the correlation of the max. peak points thereof. Therefore, in averaging the $\Delta \theta$, the measurement for the image feature points corresponding to window 62 may be disqualified and not used in the range computational equation by the range computer 72.

It is understood that while in the description of the example provided above, only three image feature points were considered and that the positions of these points were provided conveniently within the center of the interior windows making the computations relatively simple. Practically, the interior windows are expected to have as many as 200 or more image feature points from which $\theta$ and $\Delta \theta$ computations will be derived in accordance with the principles of the present invention (see FIGS. 4 and 5). With this in mind, one skilled in the pertinent art may question why the above computations do not take into consideration the $\Delta \theta$ effects caused by the depth of range in the image, near range versus far range (i.e., image points falling beyond the boresight will move further between looks than image points having locations in front of the boresight). In response, applicants respectfully point out that the $\Delta \theta$ computations are generally based on locations (dr) that are relatively close to the boresight location in the image scene and the actual range R being measured is much greater than dr. The effects of the spread in the image point locations as a result become insignificant in the range computations. In addition, a smoothing or filtering effect results because of averaging of the derived $\theta$'s and $\Delta \theta$'s for each of the registered interior windows to compute an average $\hat{\theta}$ and $\hat{\Delta\theta}$, respectively.

Other considerations may be that the image sensor or supporting aircraft may deviate from a planar range change with respect to the designated objects in the field of view of the sensor (i.e. non-planar motion). However, a simple trigonometric modification may be made to the simple range computation provided by the equation (3) hereabove, resulting in an acceptable computation of the range desired (see Equation 9, for example). It is understood that for the purposes of object classification, a precise range measurement is not always required in order to provide a better determination of the size of the object or objects in question. Thus, an enhancement of the classification process may be achieved with even a crude estimate of range which may be brought about with ease by the principles of applicants' invention as described by the specification found hereabove.

It is understood that while the present invention has been described in connection with a very simple embodiment supra, the inventive principles themselves should not be so limited. Rather, the scope and breadth of applicants' invention should be construed only by the recitation of the appended claims here to follow.

We claim:

1. In combination with an electro-optical (E-O) imaging system including: an image sensor which is transportable from one position to another position while maintaining substantially a common image scene in the field of view thereof and which is adapted to generate one and another frames of image information of said common scene corresponding to said one and another positions, respectively; and an image preprocessing means which includes: means for extracting from said one and another image frames image features representative of various objects in said common scene and for determining frame positions of said extracted image features within each frame with respect to a reference position of each frame; means for selecting at least a portion of each image frame to include a multiplicity of image features; and means for registering the extracted image features in the selected portions of said one and another frames in accordance with a predetermined matching criteria, the improvement of a passive ranging system comprising:

means for determining the changes in said frame positions of said common image features of the registered selected portions of said one and another image frames with respect to their frame reference position; and means for computing a range measurement from said image sensor to a vicinity of the image features in the selected image portions of the one and another frames as a function of the determined frame positional changes of said common image features thereof and said one and another image sensor positions with respect to said vicinity.

2. The improvement in accordance with claim 1 wherein the passive ranging system includes:

means for determining the change in position of the frame reference between the one and another image frames; and means for compensating the determined positional changes of the common image features in accordance with said determined positional change in the frame reference.

3. The improvement in accordance with claim 1 wherein the passive ranging system includes:

means for expanding the determined positional change of an image feature into radial and rotational components with respect to the frame reference position; and means for computing the range measurement using only the radial components of the positional change of the common image features.

4. The improvement in accordance with claim 1 wherein the computing means computes the range measurement based on a function which may be mathematically expressed as:

$$R = \Delta R \cdot (\theta/\Delta\theta),$$

where R is representative of the range measurement from the another position of the E-O image sensor to the vicinity of the object of the selected portion; $\Delta R$ is representative of the difference in the one and another positions of the E-O sensor from the vicinity; $\theta$ is representative of a positional relationship of the image features of the selected image portion of the another frame with respect to the reference position thereof and $\Delta\theta$ is representative of the changes in positions of the image features of the selected portion between the one and another frames.

5. In combination with an electro-optical (E-O) imaging system including: an image sensor which is transportable from one position to another position while maintaining substantially a common image scene in the field of view thereof and which is adapted to generate one and another frames of image information of said common scene corresponding to said one and another positions, respectively; and an image preprocessing means which includes: means for extracting from said one and another image frames image features representative of various objects in said common scene; means for selecting at least a portion of each image frame to include points of the image features belonging to at least one object image and for partitioning said selected image portion into a plurality of window areas; means for determining image positions of the image feature points of the partitioned window areas with respect to a frame reference point for both the one and another frames; and means for registering extracted image features of corresponding partitioned window areas of said one and another frames in accordance with a predetermined matching criteria, the improvement of a passive ranging system comprising:

means for determining variations in the image positions of common extracted image feature points of said registered partitioned window areas between said one and another frames;

means for expanding the determined positional variations of said common extracted image feature points into rotational and translational components;

first means for deriving a composite image position as a function of the image positions of the image feature points within the partitioned window areas of said another frame with respect to said frame reference point thereof;

second means for deriving a composite image position variation as a function of the translational components of said image feature point positional variations between the one and another frames;

third means for deriving a difference in range between the one and another positions of said image sensor with respect to a vicinity of said object; and means for computing a range measurement from said sensor to the vicinity of said object as a function of said derived difference in range, said derived composite image position and position variation.

6. The improvement in accordance with claim 5 wherein the partitioning means partitions the selected image portion of the one and another frames into a plurality of interior window areas and a central window area which includes the frame reference point in each frame; wherein the registering means registers the extracted image features of said central windows of the one and another frames in accordance with a predetermined matching criteria to determine the image position variation of the frame reference point between the one and another frames; and wherein the passive ranging system includes means for correcting the determined positional variations of the common extracted image feature points as a function of said determined image position variation of the frame reference point.

7. The improvement in accordance with claim 5 wherein the partitioning means partitions the selected image portion into a plurality of window areas comprising a central window area which includes the frame reference point; and wherein the expanding means expands the determined positional variations of the common extracted image feature points into a first component which is radial with respect to the frame reference point and a second component which is perpendicular to said radial component, said first and second components constituting the translational and rotational components, respectively.

8. The improvement in accordance with claim 5 wherein the computing means computes the range measurement based on a function which may be mathematically expressed as:

$$R = \Delta R(\theta/\Delta\theta),$$

where R is representative of the range measurement from the another position of the E-O image sensor to the vicinity of the object of the selected portion; $\Delta R$ is representative of the derived difference in range; $\theta$ is representative of the composite image position; and $\Delta\theta$ is representative of the composite image position variation.

* * * * *